Figure 1:
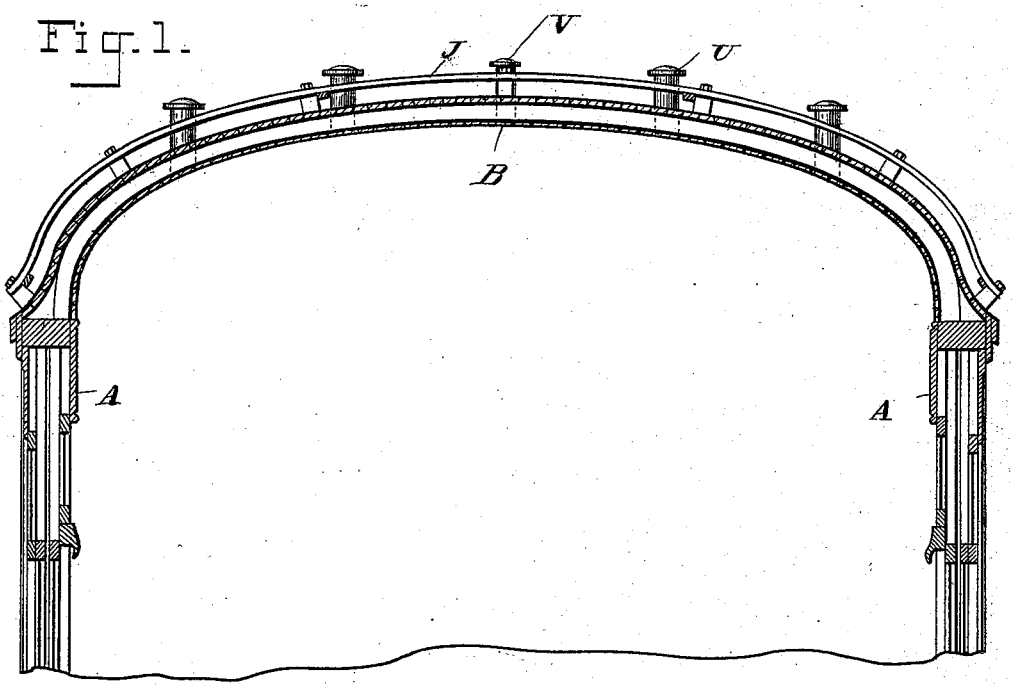

(No Model.)

W. D. MANN.
PASSENGER CAR.

No. 377,628. Patented Feb. 7, 1888.

WITNESSES.
John F. Nelson
Emma Arthur

INVENTOR.
Wm. W'Alton Mann
By Knight Bros.
Attorneys

UNITED STATES PATENT OFFICE.

WILLIAM D. MANN, OF NEW YORK, N. Y., ASSIGNOR TO MANN'S BOUDOIR CAR COMPANY, OF SAME PLACE.

PASSENGER-CAR.

SPECIFICATION forming part of Letters Patent No. 377,628, dated February 7, 1888.

Application filed July 7, 1887. Serial No. 243,665. (No model.)

*To all whom it may concern:*

Be it known that I, WILLIAM D'ALTON MANN, a citizen of the United States, residing in the city, county, and State of New York, have invented certain new and useful Improvements in Railway Passenger-Cars, of which the following is a specification.

My invention relates to means for protecting the car-roof from heat and inclement weather.

It is well known that with railway-cars as now constructed the roof becomes so impregnated and penetrated with the heat of the sun in summer-time as to be very oppressive over the heads of passengers.

By my invention I provide in an inexpensive manner for the complete protection of the roof proper from the rays of the sun, effecting a marked reduction in the heat of the car, and to preserve the supplemental roof or awning from unnecessary wear and tear I make it removable, so that it may be stowed away when its use is not required.

To these ends my invention consists in providing an external and supplemental roof surmounting the roof proper, and preferably formed of canvas, duck, or other suitable fabric stretched on transverse ribs secured to the roof proper upon interposed blocks, so as to leave an open space between the roof proper and the supplemental roof to permit the free circulation of air while protecting the roof from the rays of the sun.

In carrying out my invention I prefer to construct the roof with transverse arched ribs formed of bent wood, to which are secured above and below sheathings laid upon interposed layers of paper, said sheathings being covered on the outside by canvas suitably stretched and laid on a bed of white lead and on the inside with embossed or decorated leather, or painted canvas, or suitable hangings. At suitable points in the arched ribs I insert metallic sockets screw-threaded, for the reception of screw-bolts by which the supplemental roof may be secured.

The supplemental roof consists of transverse ribs, on which the covering of the canvas or duck is stretched after the manner of an awning or an umbrella, the ribs being secured to the permanent roof by screw-bolts passing through interposed blocks, which keep the supplemental roof at the required distance above the roof proper, so as to leave a space for the free circulation of air and prevent the conduction of heat, while the supplemental roof effectually shelters the car roof proper from the direct action of the sun's rays.

In applying my improvements to cars already built I prefer to fasten the spacing-blocks permanently to the car-roof, so as to avoid penetrating the roof with the attachments, and these blocks I in this case provide with the screw-sockets for the reception of the screw-bolts, by means of which the ribs of the supplemental roof are secured.

In either case the supplemental roof is removable at pleasure by taking out the screw-bolts, and the interposed spacing-blocks may by made to come away with the supplemental roof or may remain a permanent fixture on the car proper.

I thus provide a supplemental roof to protect the cars from the heat of the sun in summer-time. The construction permits the said roof to be quickly removed or applied whenever required or to be stowed away within small space in the winter-time when it is not required for use.

Figure 2:
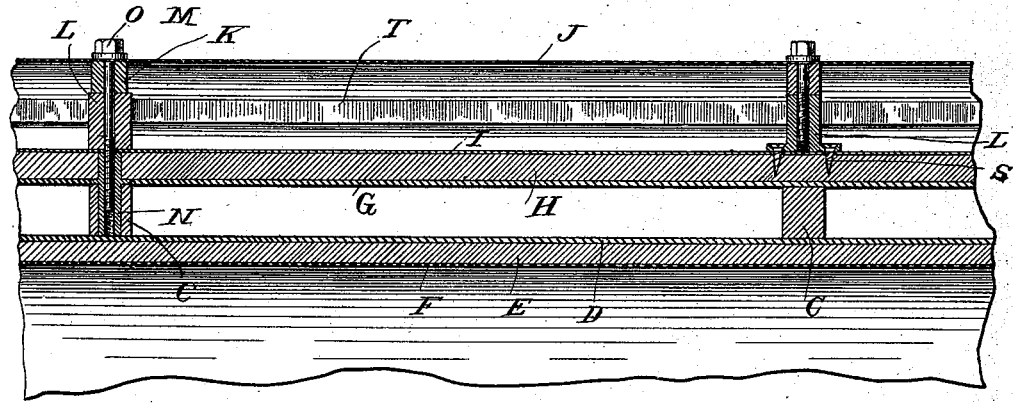

Referring to the accompanying drawings, which form a part of this specification, Figure 1 is a transverse section of the upper portion of a car with my improved construction of roof and supplemental roof attached thereto and mounted thereon. Fig. 2 is a partial longitudinal section of the same on a larger scale.

In the drawings, A A are the sides of the car-body, which sides are connected by a continuous arch or dome shaped roof, B, extending from one side of the car to the other. This roof consists of the following parts: C C are ribs arranged transversely and extending from one side of the car to the other, to the lower edges of which is attached a layer of paper, D, about one-eighth of an inch in thickness, on the under surface of which is placed a half-inch board, E. This latter is decorated on its lower surfaces with embossed leather or other fancy material. Above the wooden ribs C C is stretched paper sheeting, G, preferably of an eighth of an inch in thickness, over which is spread a three-quarter-inch board, H. This latter is coated with white lead, in which is laid a canvas cover, I, while the said lead is still moist or plastic. The canvas I forms a permanent cover of the roof proper, and it is thoroughly coated with white lead and paint, thereby forming a fire-proof roof.

Above and upon the main roof I mount a supplemental roof or umbrella, J. This is made of canvas, rubber cloth, or any other suitable material. This canvas is mounted upon transverse ribs K, which extend from one side of the said supplemental roof to the other, and these ribs seat upon suitable blocks, L, attached to the roof of the car by means of a bolt, M, extending through the said block and down into a screw-threaded sleeve, N, which latter enters the transverse ribs of the roof proper. The bolt M is provided with a square head, O, whereby it can be removed or replaced. This construction is shown in the left-hand side of Fig. 2, and is the way I mount my supplemental roof upon the cars constructed with a view of accommodating the said additional roof.

Where the attachment is to be made on cars already built, I prefer to secure the blocks in the manner shown at the right-hand side of Fig. 2, the blocks in this case being attached to the roof by means of screws S.

In either case the arrangement is such that when it is desired to remove the supplemental roof it can easily be done by unscrewing the bolts and lifting the roof off. When it is removed, it can be rolled up and stowed away until the beginning of the hot season.

Longitudinal strengthening-bars T are provided, said bars extending between the blocks aforesaid. The ventilating-exhausts U penetrate the main roof and extend above the supplemental roof, likewise the lamp-jacks V.

It will be seen by this construction that the roof will be thoroughly protected from the direct rays of the sun and that free circulation of air will be had between the two roofs, thus preventing any heated rays reaching the roof proper, and thereby destroying all radiation of heat from the roof to the interior of the car.

Having thus described my invention, the following is what I claim as new therein and desire to secure by Letters Patent:

1. In combination with the permanent roof of a railway-car, an external supplemental roof removably mounted thereon for summer use, substantially as set forth.

2. In combination with the permanent roof of a railway-car, a removable supplemental roof external to the permanent roof and consisting of transverse ribs and a covering of canvas or other suitable fabric stretched thereon, substantially as set forth.

3. The combination of the permanent roof of a railway-car, an external and removable supplemental roof, and fastenings extending through spacing-blocks to secure the supplemental roof while permitting its ready removal and affording circulation of air between the permanent roof and supplemental roof, substantially as set forth.

4. The combination of the permanent roof B, supplemental roof-cover J, ribs K, spacing-blocks L, and bolts M, for securing the external supplemental roof to the main roof and permitting its ready removal, substantially as explained.

W. D. MANN.

Witnesses:
 HERBERT KNIGHT,
 GEORGE S. BELL.